US007114570B2

(12) United States Patent
Nguyen et al.

(10) Patent No.: US 7,114,570 B2
(45) Date of Patent: Oct. 3, 2006

(54) METHODS AND COMPOSITIONS FOR STABILIZING UNCONSOLIDATED SUBTERRANEAN FORMATIONS

(75) Inventors: Philip D. Nguyen, Duncan, OK (US); Johnny A. Barton, Marlow, OK (US); O. Marlene Isenberg, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

(21) Appl. No.: 10/408,800

(22) Filed: Apr. 7, 2003

(65) Prior Publication Data

US 2004/0194961 A1 Oct. 7, 2004

(51) Int. Cl.
 *E21B 33/138* (2006.01)
(52) U.S. Cl. .................................... 166/295; 166/300
(58) Field of Classification Search ........ 166/292–295, 166/300; 507/219, 22, 239, 244, 261, 220
 See application file for complete search history.

(56) References Cited

U.S. PATENT DOCUMENTS

| | | | |
|---|---|---|---|
| 2,238,671 A | 4/1941 | Woodhouse | |
| 2,703,316 A | 3/1955 | Schneider | 260/78.3 |
| 2,869,642 A | 1/1959 | McKay et al. | |
| 3,047,067 A | 7/1962 | Williams et al. | |
| 3,123,138 A | 3/1964 | Robichaux | 166/33 |
| 3,176,768 A | 4/1965 | Brandt et al. | |
| 3,199,590 A | 8/1965 | Young | 166/33 |
| 3,272,650 A | 9/1966 | MacVittie | 134/7 |
| 3,297,086 A | 1/1967 | Spain | 166/33 |
| 3,308,885 A | 3/1967 | Sandiford | 166/33 |
| 3,316,965 A | 5/1967 | Watanabe | |
| 3,375,872 A | 4/1968 | McLaughlin et al. | |
| 3,404,735 A | 10/1968 | Young et al. | 166/33 |
| 3,415,320 A | 12/1968 | Young | 166/33 |
| 3,481,403 A | 12/1969 | Gidley et al. | 166/295 |
| 3,492,147 A | 1/1970 | Young et al. | 117/62.2 |
| 3,659,651 A | 5/1972 | Graham | |
| 3,681,287 A | 8/1972 | Brown et al. | 260/67 |
| 3,754,598 A | 8/1973 | Holloway, Jr. | 166/249 |
| 3,765,804 A | 10/1973 | Brandon | 417/540 |
| 3,768,564 A | 10/1973 | Knox et al. | 166/307 |
| 3,784,585 A | 1/1974 | Schmitt et al. | 260/861 |
| 3,819,525 A | 6/1974 | Hattenbrun | 252/132 |
| 3,828,854 A | 8/1974 | Templeton et al. | 166/307 |
| 3,842,911 A | 10/1974 | Know et al. | 166/307 |
| 3,854,533 A | 12/1974 | Gurley et al. | 166/276 |
| 3,857,444 A | 12/1974 | Copeland | 166/276 |
| 3,863,709 A | 2/1975 | Fitch | 165/1 |
| 3,868,998 A | 3/1975 | Lybarger et al. | 166/278 |
| 3,888,311 A | 6/1975 | Cooke, Jr. | |
| 3,902,557 A | 9/1975 | Shaughnessy et al. | 166/295 |
| 3,912,692 A | 10/1975 | Casey et al. | 260/78.3 |
| 3,948,672 A | 4/1976 | Harnsberger | 106/90 |
| 3,955,993 A | 5/1976 | Curtice | 106/90 |
| 3,960,736 A | 6/1976 | Free et al. | 252/8.55 R |
| 4,000,781 A | 1/1977 | Knapp | 166/276 |
| 4,008,763 A | 2/1977 | Lowe et al. | 166/253 |
| 4,029,148 A | 6/1977 | Emery | 166/250.1 |
| 4,031,958 A | 6/1977 | Sandiford et al. | 166/270 |
| 4,042,032 A | 8/1977 | Anderson et al. | 166/276 |
| 4,070,865 A | 1/1978 | McLaughlin | 61/36 |
| 4,074,760 A | 2/1978 | Copeland et al. | 166/276 |
| 4,127,173 A | 11/1978 | Watkins et al. | 166/276 |
| 4,169,798 A | 10/1979 | DeMartino | 252/8.55 R |
| 4,172,066 A | 10/1979 | Zweigle et al. | 260/29.6 TA |
| 4,245,702 A | 1/1981 | Haafkens et al. | 166/307 |
| 4,259,205 A | 3/1981 | Murphey | 252/326 |
| 4,273,187 A | 6/1981 | Satter et al. | 166/250 |
| 4,291,766 A | 9/1981 | Davies et al. | 166/276 |
| 4,305,463 A | 12/1981 | Zakiewicz | 106/245 |
| 4,336,842 A | 6/1982 | Graham et al. | 166/276 |
| 4,352,674 A | 10/1982 | Fery | 23/230 |
| 4,353,806 A | 10/1982 | Canter et al. | 507/229 |
| 4,387,769 A | 6/1983 | Erbstoesser et al. | 166/295 |
| 4,415,805 A | 11/1983 | Fertl et al. | 250/260 |
| 4,439,489 A | 3/1984 | Johnson et al. | 428/404 |
| 4,443,347 A | 4/1984 | Underdown et al. | 252/8.55 R |
| 4,460,052 A | 7/1984 | Gockel | 175/72 |
| 4,470,915 A | 9/1984 | Conway | 252/8.55 R |
| 4,493,875 A | 1/1985 | Beck et al. | 428/403 |
| 4,494,605 A | 1/1985 | Wiechel et al. | 166/288 |
| 4,498,995 A | 2/1985 | Gockel | 252/8.5 LC |
| 4,501,328 A | 2/1985 | Nichols | 166/288 |
| 4,526,695 A | 7/1985 | Erbstosser et al. | 252/8.55 R |
| 4,527,627 A | 7/1985 | Graham et al. | |
| 4,541,489 A | 9/1985 | Wu | 166/312 |

(Continued)

FOREIGN PATENT DOCUMENTS

CA   2063877   5/2003

(Continued)

OTHER PUBLICATIONS

Foreign Search Report and Opinion (PCT Appl. No. GB2004/001497), Jul. 14, 2004.

(Continued)

*Primary Examiner*—Zakiya Walker
(74) *Attorney, Agent, or Firm*—Robert A. Kent; Baker Botts

(57) ABSTRACT

Methods of stabilizing subterranean formations and methods of reducing the production of particulates from subterranean formations are provided, which are useful in conjunction with subterranean formations surrounding wellbores and fractures. The methods comprise the steps of applying to a subterranean formation a combination aqueous liquid and surfactant preflush solution, an integrated consolidation fluid and an afterflush fluid and then waiting a chosen period of time.

66 Claims, No Drawings

U.S. PATENT DOCUMENTS

| | | | |
|---|---|---|---|
| 4,546,012 A | 10/1985 | Brooks | 427/213 |
| 4,553,596 A | 11/1985 | Graham et al. | 166/295 |
| 4,564,459 A | 1/1986 | Underdown et al. | 252/8.55 R |
| 4,572,803 A | 2/1986 | Yamazoe et al. | 534/16 |
| 4,649,998 A | 3/1987 | Friedman | 166/294 |
| 4,664,819 A | 5/1987 | Glaze et al. | 252/8.551 |
| 4,665,988 A | 5/1987 | Murphey et al. | 166/295 |
| 4,669,543 A | 6/1987 | Young | 166/276 |
| 4,675,140 A | 6/1987 | Sparks et al. | 264/4.3 |
| 4,683,954 A | 8/1987 | Walker et al. | 166/307 |
| 4,694,905 A | 9/1987 | Armbruster | |
| 4,715,967 A | 12/1987 | Bellis | 252/8.551 |
| 4,716,964 A | 1/1988 | Erbstoesser et al. | 166/284 |
| 4,733,729 A | 3/1988 | Copeland | 166/276 |
| 4,739,832 A | 4/1988 | Jennings, Jr. et al. | 166/299 |
| 4,785,884 A | 11/1988 | Armbruster | |
| 4,787,453 A | 11/1988 | Hewgill et al. | 166/272.3 |
| 4,789,105 A | 12/1988 | Hosokawa et al. | 241/67 |
| 4,796,701 A | 1/1989 | Hudson et al. | 166/278 |
| 4,797,262 A | 1/1989 | Dewitz | 422/142 |
| 4,800,960 A | 1/1989 | Friedman et al. | 166/276 |
| 4,809,783 A | 3/1989 | Hollenbeck et al. | 166/307 |
| 4,817,721 A | 4/1989 | Pober | 166/295 |
| 4,829,100 A | 5/1989 | Murphey et al. | 523/131 |
| 4,838,352 A | 6/1989 | Oberste-Padtberg et al. | 166/291 |
| 4,842,072 A | 6/1989 | Friedman et al. | 166/295 |
| 4,843,118 A | 6/1989 | Lai et al. | 524/555 |
| 4,848,467 A | 7/1989 | Cantu et al. | 166/281 |
| 4,848,470 A | 7/1989 | Korpics | 166/312 |
| 4,850,430 A | 7/1989 | Copeland et al. | 166/276 |
| 4,886,354 A | 12/1989 | Welch et al. | 356/70 |
| 4,888,240 A | 12/1989 | Graham et al. | 428/403 |
| 4,895,207 A | 1/1990 | Friedman et al. | 166/276 |
| 4,903,770 A | 2/1990 | Friedman et al. | 166/288 |
| 4,934,456 A | 6/1990 | Moradi-Araghi | 166/270 |
| 4,936,385 A | 6/1990 | Weaver et al. | 166/288 |
| 4,942,186 A | 7/1990 | Murphey et al. | 523/131 |
| 4,957,165 A | 9/1990 | Cantu et al. | 166/295 |
| 4,959,432 A | 9/1990 | Fan et al. | 526/287 |
| 4,961,466 A | 10/1990 | Himes et al. | 166/250 |
| 4,969,522 A | 11/1990 | Whitehurst et al. | 166/278 |
| 4,969,523 A | 11/1990 | Martin et al. | 166/278 |
| 4,986,353 A | 1/1991 | Clark et al. | 166/279 |
| 4,986,354 A | 1/1991 | Cantu et al. | 166/279 |
| 4,986,355 A | 1/1991 | Casad et al. | 166/295 |
| 5,030,603 A | 7/1991 | Rumpf et al. | 501/127 |
| 5,049,743 A | 9/1991 | Taylor, III et al. | 250/303 |
| 5,082,056 A | 1/1992 | Tackett, Jr. | 166/295 |
| 5,107,928 A | 4/1992 | Hilterhaus | 166/293 |
| 5,128,390 A | 7/1992 | Murphey et al. | 523/130 |
| 5,135,051 A | 8/1992 | Fracteau et al. | 166/104 |
| 5,142,023 A | 8/1992 | Gruber et al. | 528/354 |
| 5,165,438 A | 11/1992 | Fracteau et al. | 137/1 |
| 5,173,527 A | 12/1992 | Calve | 524/74 |
| 5,178,218 A | 1/1993 | Dees | 166/281 |
| 5,182,051 A | 1/1993 | Bandy et al. | 252/645 |
| 5,199,491 A | 4/1993 | Kutts et al. | 166/276 |
| 5,199,492 A | 4/1993 | Surles et al. | 166/295 |
| 5,211,234 A | 5/1993 | Floyd | 166/276 |
| 5,216,050 A | 6/1993 | Sinclair | 524/108 |
| 5,218,038 A | 6/1993 | Johnson et al. | 524/541 |
| 5,232,955 A | 8/1993 | Caabai et al. | 521/63 |
| 5,232,961 A | 8/1993 | Murphey et al. | 523/414 |
| 5,238,068 A | 8/1993 | Fredrickson | 166/307 |
| 5,247,059 A | 9/1993 | Gruber et al. | 528/354 |
| 5,249,628 A | 10/1993 | Surjaatmadja | 166/305 |
| 5,256,729 A | 10/1993 | Kutts et al. | 524/700 |
| 5,273,115 A | 12/1993 | Spafford | 166/281 |
| 5,285,849 A | 2/1994 | Surles et al. | 166/295 |
| 5,293,939 A | 3/1994 | Surles et al. | 166/295 |
| 5,295,542 A | 3/1994 | Cole et al. | 166/278 |
| 5,320,171 A | 6/1994 | Laramay | 166/285 |
| 5,321,062 A | 6/1994 | Landrum et al. | 523/414 |
| 5,325,923 A | 7/1994 | Surjaatmadja et al. | 166/308 |
| 5,330,005 A | 7/1994 | Card et al. | |
| 5,332,037 A | 7/1994 | Schmidt et al. | 166/276 |
| 5,335,726 A | 8/1994 | Rodrogues | 166/295 |
| 5,351,754 A | 10/1994 | Hardin et al. | 166/249 |
| 5,358,051 A | 10/1994 | Rodrigues | 166/295 |
| 5,359,026 A | 10/1994 | Gruber | 528/354 |
| 5,360,068 A | 11/1994 | Sprunt et al. | 166/259 |
| 5,361,856 A | 11/1994 | Surjaatmajda et al. | 175/67 |
| 5,363,916 A | 11/1994 | Himes et al. | 166/276 |
| 5,373,901 A | 12/1994 | Norman et al. | 166/300 |
| 5,381,864 A | 1/1995 | Nguyen et al. | |
| 5,386,874 A | 2/1995 | Laramay et al. | 166/300 |
| 5,388,648 A | 2/1995 | Jordan, Jr. | 166/380 |
| 5,393,810 A | 2/1995 | Harris et al. | 524/56 |
| 5,396,957 A | 3/1995 | Surjaatmadja et al. | 166/308 |
| 5,402,846 A | 4/1995 | Jennings, Jr. et al. | 166/259 |
| 5,422,183 A | 6/1995 | Sinclair et al. | 428/403 |
| 5,423,381 A | 6/1995 | Surles et al. | 166/295 |
| 5,439,055 A | 8/1995 | Card et al. | 166/280 |
| 5,460,226 A | 10/1995 | Lawton et al. | 166/300 |
| 5,464,060 A | 11/1995 | Hale et al. | 166/293 |
| 5,475,080 A | 12/1995 | Gruber et al. | 528/354 |
| 5,484,881 A | 1/1996 | Gruber et al. | 528/54 |
| 5,492,178 A | 2/1996 | Nguyen et al. | 166/276 |
| 5,494,103 A | 2/1996 | Surjaatmadja et al. | 166/222 |
| 5,497,830 A | 3/1996 | Boles et al. | 166/300 |
| 5,498,280 A | 3/1996 | Fistner et al. | 106/19 |
| 5,499,678 A | 3/1996 | Surjaatmadja et al. | 166/298 |
| 5,501,275 A | 3/1996 | Card et al. | |
| 5,505,787 A | 4/1996 | Yamaguchi | 134/4 |
| 5,512,071 A | 4/1996 | Yam et al. | 51/307 |
| 5,520,250 A | 5/1996 | Harry et al. | 166/278 |
| 5,522,460 A | 6/1996 | Shu | 166/295 |
| 5,529,123 A | 6/1996 | Carpenter et al. | 166/293 |
| 5,531,274 A | 7/1996 | Bienvenu, Jr. | |
| 5,536,807 A | 7/1996 | Gruber et al. | 528/354 |
| 5,545,824 A | 8/1996 | Stengel et al. | 524/590 |
| 5,547,023 A | 8/1996 | McDaniel et al. | 166/280 |
| 5,551,513 A | 9/1996 | Suries et al. | 166/278 |
| 5,551,514 A | 9/1996 | Nelson et al. | |
| 5,582,249 A | 12/1996 | Caveny et al. | 166/276 |
| 5,582,250 A | 12/1996 | Constien | |
| 5,588,488 A | 12/1996 | Vijn et al. | 166/293 |
| 5,591,700 A | 1/1997 | Harris et al. | 507/204 |
| 5,594,095 A | 1/1997 | Gruber et al. | 528/354 |
| 5,595,245 A | 1/1997 | Scott, III | 166/250.1 |
| 5,597,784 A | 1/1997 | Sinclair et al. | 507/219 |
| 5,604,184 A | 2/1997 | Ellis et al. | 507/117 |
| 5,604,186 A | 2/1997 | Hunt et al. | 507/204 |
| 5,609,207 A | 3/1997 | Dewprashad et al. | 166/276 |
| 5,620,049 A | 4/1997 | Gipson et al. | 166/248 |
| 5,639,806 A | 6/1997 | Johnson et al. | 523/208 |
| 5,670,473 A | 9/1997 | Scepanski | 510/445 |
| 5,697,440 A | 12/1997 | Weaver et al. | 166/281 |
| 5,698,322 A | 12/1997 | Tsai et al. | 428/373 |
| 5,712,314 A | 1/1998 | Surles et al. | 521/41 |
| 5,732,364 A | 3/1998 | Kalb et al. | 588/8 |
| 5,765,642 A | 6/1998 | Surjaatmadja | 166/297 |
| 5,775,425 A | 7/1998 | Weaver et al. | 166/276 |
| 5,782,300 A | 7/1998 | James et al. | 166/278 |
| 5,783,822 A | 7/1998 | Buchanan et al. | 250/259 |
| 5,787,986 A | 8/1998 | Weaver et al. | |
| 5,791,415 A | 8/1998 | Nguyen et al. | |
| 5,799,734 A | 9/1998 | Norman et al. | 166/278 |
| 5,806,593 A | 9/1998 | Suries | 166/270 |
| 5,830,987 A | 11/1998 | Smith | 528/332 |
| 5,833,000 A | 11/1998 | Weaver et al. | 166/276 |
| 5,833,361 A | 11/1998 | Funk | 366/80 |
| 5,836,391 A | 11/1998 | Jonasson et al. | 166/295 |

| | | | |
|---|---|---|---|
| 5,836,392 A | 11/1998 | Urlwin-Smith ............. 166/295 |
| 5,837,656 A | 11/1998 | Sinclair et al. ............. 507/220 |
| 5,837,785 A | 11/1998 | Kinsho et al. ............. 525/527 |
| 5,839,510 A | 11/1998 | Weaver et al. ............. 166/276 |
| 5,840,784 A | 11/1998 | Funkhouser et al. ........ 523/130 |
| 5,849,401 A | 12/1998 | El-Afandi et al. ........... 428/215 |
| 5,849,590 A | 12/1998 | Anderson, II et al. ........ 436/27 |
| 5,853,048 A | 12/1998 | Weaver et al. ............. 166/279 |
| 5,864,003 A | 1/1999 | Qureshi et al. ............. 528/141 |
| 5,865,936 A | 2/1999 | Edelman et al. ............. 156/310 |
| 5,871,049 A | 2/1999 | Weaver et al. ............. 166/276 |
| 5,873,413 A | 2/1999 | Chatterji et al. ............. 166/293 |
| 5,875,844 A | 3/1999 | Chatterji et al. ............. 166/293 |
| 5,875,845 A | 3/1999 | Chatterji et al. ............. 166/293 |
| 5,875,846 A | 3/1999 | Chatterji et al. ............. 166/293 |
| 5,893,383 A | 4/1999 | Facteau ...................... 137/14 |
| 5,893,416 A | 4/1999 | Read ......................... 166/304 |
| 5,908,073 A | 6/1999 | Nguyen et al. ............. 166/276 |
| 5,911,282 A | 6/1999 | Onan et al. .................. 175/72 |
| 5,916,933 A | 6/1999 | Johnson et al. ............. 523/208 |
| 5,921,317 A | 7/1999 | Dewprashad et al. ........ 166/208 |
| 5,924,488 A | 7/1999 | Nguyen et al. |
| 5,929,437 A | 7/1999 | Elliott et al. ................. 250/259 |
| 5,944,105 A | 8/1999 | Nguyen ...................... 166/278 |
| 5,945,387 A | 8/1999 | Chatterji et al. ............. 507/224 |
| 5,948,734 A | 9/1999 | Sinclair et al. ............. 507/219 |
| 5,957,204 A | 9/1999 | Chatterji et al. ............. 166/295 |
| 5,960,877 A | 10/1999 | Funkhouser et al. ........ 166/270 |
| 5,960,880 A | 10/1999 | Nguyen et al. |
| 5,964,291 A | 10/1999 | Bourne et al. ............. 166/279 |
| 5,969,006 A | 10/1999 | Onan et al. .................. 523/166 |
| 5,977,283 A | 11/1999 | Rossitto ...................... 528/44 |
| 5,994,785 A | 11/1999 | Higuchi et al. ............. 527/789 |
| RE36,466 E | 12/1999 | Nelson et al. ............. 166/280 |
| 6,003,600 A | 12/1999 | Nguyen et al. ............. 166/281 |
| 6,004,400 A | 12/1999 | Bishop et al. .................. 134/2 |
| 6,006,835 A | 12/1999 | Onan et al. .................. 166/295 |
| 6,006,836 A | 12/1999 | Chatterji et al. ............. 166/295 |
| 6,012,524 A | 1/2000 | Chatterji et al. ............. 166/295 |
| 6,016,870 A | 1/2000 | Dewprashad et al. ........ 166/295 |
| 6,024,170 A | 2/2000 | McCabe et al. ............. 166/300 |
| 6,028,113 A | 2/2000 | Scepanski ................... 514/643 |
| 6,028,534 A | 2/2000 | Ciglenec et al. ........ 340/856.2 |
| 6,040,398 A | 3/2000 | Kinsho et al. ............. 525/527 |
| 6,047,772 A | 4/2000 | Weaver et al. ............. 166/276 |
| 6,059,034 A | 5/2000 | Rickards et al. |
| 6,059,035 A | 5/2000 | Chatterji et al. ............. 166/293 |
| 6,059,036 A | 5/2000 | Chatterji et al. ............. 166/294 |
| 6,068,055 A | 5/2000 | Chatterji et al. ............. 166/293 |
| 6,069,117 A | 5/2000 | Onan et al. .................. 507/202 |
| 6,074,739 A | 6/2000 | Katagiri ...................... 428/323 |
| 6,079,492 A | 6/2000 | Hoogteijling et al. ........ 166/276 |
| 6,098,711 A | 8/2000 | Chatterji et al. ............. 166/294 |
| 6,114,410 A | 9/2000 | Betzold ...................... 523/130 |
| 6,123,871 A | 9/2000 | Carroll ................... 252/301.36 |
| 6,123,965 A | 9/2000 | Jacob et al. ................. 424/489 |
| 6,124,246 A | 9/2000 | Heathman et al. ........... 507/219 |
| 6,130,286 A | 10/2000 | Thomas et al. ............. 524/507 |
| 6,135,987 A | 10/2000 | Tsai et al. .................... 604/365 |
| 6,140,446 A | 10/2000 | Fujiki et al. .................. 528/15 |
| 6,148,911 A | 11/2000 | Gipson et al. ............. 166/248 |
| 6,152,234 A | 11/2000 | Newhouse et al. ......... 166/403 |
| 6,162,766 A | 12/2000 | Muir et al. .................. 507/267 |
| 6,165,947 A | 12/2000 | Chang et al. ............. 507/216 |
| 6,169,058 B1 | 1/2001 | Le et al. ...................... 507/222 |
| 6,172,011 B1 | 1/2001 | Card et al. ................. 507/204 |
| 6,172,077 B1 | 1/2001 | Curtis et al. ................. 514/278 |
| 6,176,315 B1 | 1/2001 | Reddy et al. ............. 166/295 |
| 6,177,484 B1 | 1/2001 | Suries ....................... 523/131 |
| 6,184,311 B1 | 2/2001 | O'Keefe et al. ............. 525/438 |
| 6,187,834 B1 | 2/2001 | Thayer et al. ............... 522/15 |
| 6,187,839 B1 | 2/2001 | Eoff et al. .................. 523/130 |
| 6,189,615 B1 | 2/2001 | Sydansk ..................... 166/270 |
| 6,192,985 B1 | 2/2001 | Hinkel et al. |
| 6,192,986 B1 | 2/2001 | Urlwin-Smith ............. 166/295 |
| 6,196,317 B1 | 3/2001 | Hardy ......................... 166/295 |
| 6,202,751 B1 | 3/2001 | Chatterji et al. ............. 166/276 |
| 6,209,643 B1 | 4/2001 | Nguyen et al. ............. 166/276 |
| 6,209,644 B1 | 4/2001 | Brunet ......................... 166/297 |
| 6,209,646 B1 | 4/2001 | Reddy et al. ............. 166/300 |
| 6,210,471 B1 | 4/2001 | Craig ...................... 106/31.08 |
| 6,214,773 B1 | 4/2001 | Harris et al. ............. 507/271 |
| 6,231,664 B1 | 5/2001 | Chatterji et al. ............. 106/724 |
| 6,234,251 B1 | 5/2001 | Chatterji et al. ............. 166/295 |
| 6,238,597 B1 | 5/2001 | Yim et al. ................... 252/512 |
| 6,241,019 B1 | 6/2001 | Davidson et al. ........... 166/249 |
| 6,242,390 B1 | 6/2001 | Mitchell et al. ............. 507/211 |
| 6,244,344 B1 | 6/2001 | Chatterji et al. ............. 166/295 |
| 6,257,335 B1 | 7/2001 | Nguyen et al. ............. 166/280 |
| 6,260,622 B1 | 7/2001 | Blok et al. ............. 166/305.1 |
| 6,271,181 B1 | 8/2001 | Chatterji et al. ............. 507/219 |
| 6,274,650 B1 | 8/2001 | Cui ............................. 523/457 |
| 6,279,652 B1 | 8/2001 | Chatterji et al. ............. 166/194 |
| 6,279,656 B1 | 8/2001 | Sinclair et al. ............. 166/310 |
| 6,283,214 B1 | 9/2001 | Guinot et al. ............... 166/297 |
| 6,302,207 B1 | 10/2001 | Nguyen et al. ............. 166/276 |
| 6,306,998 B1 | 10/2001 | Kimura et al. ............. 528/12 |
| 6,311,773 B1 | 11/2001 | Todd et al. .................. 166/280 |
| 6,321,841 B1 | 11/2001 | Eoff et al. .................. 166/291 |
| 6,323,307 B1 | 11/2001 | Bigg et al. .................. 528/354 |
| 6,326,458 B1 | 12/2001 | Gruber et al. ............. 528/354 |
| 6,328,105 B1 | 12/2001 | Betzold ...................... 166/280 |
| 6,328,106 B1 | 12/2001 | Griffith et al. ............. 166/295 |
| 6,330,916 B1 | 12/2001 | Rickards et al. ............. 166/280 |
| 6,330,917 B1 | 12/2001 | Chatterji et al. ............. 166/295 |
| 6,342,467 B1 | 1/2002 | Chang et al. ............. 507/110 |
| 6,350,309 B1 | 2/2002 | Chatterji et al. ............. 106/677 |
| 6,357,527 B1 | 3/2002 | Norman et al. ............. 166/300 |
| 6,364,018 B1 | 4/2002 | Brannon et al. ......... 166/280.2 |
| 6,364,945 B1 | 4/2002 | Chatterji et al. ............. 106/677 |
| 6,367,165 B1 | 4/2002 | Huttlin ......................... 34/582 |
| 6,367,549 B1 | 4/2002 | Chatterji et al. ............. 166/292 |
| 6,372,678 B1 | 4/2002 | Youngsman et al. ........ 504/128 |
| 6,376,571 B1 | 4/2002 | Chawla et al. ............. 522/64 |
| 6,387,986 B1 | 5/2002 | Moradi-Araghi et al. ... 523/211 |
| 6,390,195 B1 | 5/2002 | Nguyen et al. ............. 166/276 |
| 6,401,817 B1 | 6/2002 | Griffith et al. ............. 166/295 |
| 6,405,797 B1 | 6/2002 | Davidson et al. ........... 166/249 |
| 6,406,789 B1 | 6/2002 | McDaniel et al. ........... 428/403 |
| 6,408,943 B1 | 6/2002 | Schultz et al. ............. 166/285 |
| 6,422,314 B1 | 7/2002 | Todd et al. .................. 166/312 |
| 6,439,309 B1 | 8/2002 | Matherly et al. ............. 166/276 |
| 6,439,310 B1 | 8/2002 | Scott, III et al. ........... 168/308 |
| 6,440,255 B1 | 8/2002 | Kohlhammer et al. ...... 156/283 |
| 6,446,727 B1 | 9/2002 | Zemlak et al. ............. 166/308 |
| 6,448,206 B1 | 9/2002 | Griffith et al. ............. 507/219 |
| 6,450,260 B1 | 9/2002 | James et al. ............. 166/277 |
| 6,454,003 B1 | 9/2002 | Chang et al. ............. 166/270 |
| 6,458,885 B1 | 10/2002 | Stengal et al. ............. 524/507 |
| 6,485,947 B1 | 11/2002 | Rajgarhia et al. ........... 435/139 |
| 6,488,091 B1 | 12/2002 | Weaver et al. ............. 166/300 |
| 6,488,763 B1 | 12/2002 | Brothers et al. ............. 106/692 |
| 6,494,263 B1 | 12/2002 | Todd ......................... 166/312 |
| 6,503,870 B1 | 1/2003 | Griffith et al. ............. 507/219 |
| 6,508,305 B1 | 1/2003 | Brannon et al. ............. 166/293 |
| 6,527,051 B1 | 3/2003 | Reddy et al. ............. 166/300 |
| 6,528,157 B1 | 3/2003 | Hussain et al. ............. 428/325 |
| 6,531,427 B1 | 3/2003 | Shuchart et al. ............. 507/267 |
| 6,538,576 B1 | 3/2003 | Schultz et al. ............. 340/859.6 |
| 6,543,545 B1 | 4/2003 | Chatterji et al. ............. 166/381 |
| 6,552,333 B1 | 4/2003 | Storm et al. ................. 250/269.3 |
| 6,554,071 B1 | 4/2003 | Reddy et al. ............. 166/293 |
| 6,555,507 B1 | 4/2003 | Chatterji et al. ............. 507/219 |
| 6,569,814 B1 | 5/2003 | Brady et al. ................. 507/201 |
| 6,582,819 B1 | 6/2003 | McDaniel et al. ............. 428/402 |
| 6,593,402 B1 | 7/2003 | Chatterji et al. ............. 524/7 |

| | | | |
|---|---|---|---|
| 6,599,863 B1 | 7/2003 | Palmer et al. | 507/219 |
| 6,608,162 B1 | 8/2003 | Chiu et al. | 528/129 |
| 6,616,320 B1 | 9/2003 | Huber et al. | 366/156.2 |
| 6,620,857 B1 | 9/2003 | Valet | 522/42 |
| 6,626,241 B1 | 9/2003 | Nguyen | 166/278 |
| 6,632,527 B1 | 10/2003 | McDaniel et al. | 428/402 |
| 6,632,892 B1 | 10/2003 | Rubinsztajn et al. | 525/476 |
| 6,642,309 B1 | 11/2003 | Komitsu et al. | 525/100 |
| 6,648,501 B1 | 11/2003 | Huber et al. | 366/301 |
| 6,659,179 B1 | 12/2003 | Nguyen | 166/227 |
| 6,664,343 B1 | 12/2003 | Narisawa et al. | 525/474 |
| 6,667,279 B1 | 12/2003 | Hessert et al. | 507/225 |
| 6,668,926 B1 | 12/2003 | Nguyen et al. | 166/280 |
| 6,669,771 B1 | 12/2003 | Tokiwa et al. | 106/162.7 |
| 6,681,856 B1 | 1/2004 | Chatterji et al. | 166/294 |
| 6,686,328 B1 | 2/2004 | Binder | 510/446 |
| 6,705,400 B1 | 3/2004 | Nguyen et al. | 166/281 |
| 6,710,019 B1 | 3/2004 | Sawdon et al. | 507/136 |
| 6,713,170 B1 | 3/2004 | Kaneko et al. | 428/323 |
| 6,725,926 B1 | 4/2004 | Nguyen et al. | 166/254.1 |
| 6,725,931 B1 | 4/2004 | Nguyen et al. | 166/280.2 |
| 6,729,404 B1 | 5/2004 | Nguyen et al. | 166/280.2 |
| 6,732,800 B1 | 5/2004 | Acock et al. | 166/308 |
| 6,745,159 B1 | 6/2004 | Todd et al. | 703/10 |
| 6,749,025 B1 | 6/2004 | Brannon et al. | 166/305.1 |
| 6,763,888 B1 | 7/2004 | Harris et al. | 166/305.1 |
| 6,766,858 B1 | 7/2004 | Nguyen et al. | 166/300 |
| 6,776,236 B1 | 8/2004 | Nguyen | 166/279 |
| 6,832,650 B1 | 12/2004 | Nguyen et al. | 166/279 |
| 6,851,474 B1 | 2/2005 | Nguyen | 166/279 |
| 6,887,834 B1 | 5/2005 | Nguyen et al. | 507/221 |
| 6,978,836 B1 | 12/2005 | Nguyen et al. | 166/295 |
| 2001/0016562 A1 | 8/2001 | Muir et al. | 507/201 |
| 2002/0043370 A1 | 4/2002 | Poe | 166/250.07 |
| 2002/0048676 A1 | 4/2002 | McDaniel et al. | 428/404 |
| 2002/0070020 A1 | 6/2002 | Nguyen | 166/295 |
| 2003/0006036 A1 | 1/2003 | Malone et al. | 166/250.12 |
| 2003/0060374 A1 | 3/2003 | Cooke, Jr. | 507/200 |
| 2003/0114314 A1 | 6/2003 | Ballard et al. | 507/100 |
| 2003/0130133 A1 | 7/2003 | Vollmer | 507/100 |
| 2003/0131999 A1 | 7/2003 | Nguyen et al. | 166/280 |
| 2003/0148893 A1 | 8/2003 | Lungofer et al. | 507/200 |
| 2003/0186820 A1 | 10/2003 | Thesing | 507/200 |
| 2003/0188766 A1 | 10/2003 | Banerjee et al. | 134/7 |
| 2003/0188872 A1 | 10/2003 | Nguyen et al. | 166/308 |
| 2003/0196805 A1 | 10/2003 | Boney et al. | 166/280 |
| 2003/0205376 A1 | 11/2003 | Ayoub et al. | 166/254.2 |
| 2003/0230408 A1 | 12/2003 | Acock et al. | 166/297 |
| 2003/0234103 A1 | 12/2003 | Lee et al. | 166/293 |
| 2004/0000402 A1 | 1/2004 | Nguyen et al. | 166/280 |
| 2004/0014607 A1 | 1/2004 | Sinclair et al. | 507/200 |
| 2004/0014608 A1 | 1/2004 | Nguyen et al. | 507/200 |
| 2004/0040706 A1 | 3/2004 | Hossaini et al. | 166/278 |
| 2004/0040708 A1 | 3/2004 | Stephenson et al. | 166/280.1 |
| 2004/0040713 A1 | 3/2004 | Nguyen et al. | 166/295 |
| 2004/0048752 A1 | 3/2004 | Nguyen et al. | 507/269 |
| 2004/0055747 A1 | 3/2004 | Lee | 166/278 |
| 2004/0106525 A1 | 6/2004 | Willbert et al. | 507/200 |
| 2004/0138068 A1 | 7/2004 | Rimmer et al. | 507/100 |
| 2004/0149441 A1 | 8/2004 | Nguyen et al. | 166/280.1 |
| 2004/0152601 A1 | 8/2004 | Still et al. | 507/100 |
| 2004/0177961 A1 | 9/2004 | Nguyen et al. | 166/280.2 |
| 2004/0194961 A1 | 10/2004 | Nguyen et al. | 166/295 |
| 2004/0206499 A1 | 10/2004 | Nguyen et al. | 166/280.2 |
| 2004/0211559 A1 | 10/2004 | Nguyen et al. | 166/276 |
| 2004/0211561 A1 | 10/2004 | Nguyen et al. | 166/280.2 |
| 2004/0221992 A1 | 11/2004 | Nguyen et al. | 166/295 |
| 2004/0231845 A1 | 11/2004 | Cooke, Jr. | 166/279 |
| 2004/0231847 A1 | 11/2004 | Nguyen et al. | 166/295 |
| 2004/0256099 A1 | 12/2004 | Nguyen et al. | 166/249 |
| 2004/0261995 A1 | 12/2004 | Nguyen et al. | 166/279 |
| 2004/0261997 A1 | 12/2004 | Nguyen et al. | 166/281 |
| 2005/0000731 A1 | 1/2005 | Nguyen et al. | 175/57 |
| 2005/0006093 A1 | 1/2005 | Nguyen et al. | 166/281 |
| 2005/0006095 A1 | 1/2005 | Justus et al. | 166/295 |
| 2005/0006096 A1 | 1/2005 | Nguyen et al. | 166/295 |
| 2005/0045326 A1 | 3/2005 | Nguyen | 166/278 |

FOREIGN PATENT DOCUMENTS

| | | |
|---|---|---|
| EP | 0313243 B1 | 10/1988 |
| EP | 0528595 A1 | 8/1992 |
| EP | 0510762 A2 | 11/1992 |
| EP | 0643196 A2 | 6/1994 |
| EP | 0834644 A2 | 4/1998 |
| EP | 0853186 A2 | 7/1998 |
| EP | 0864726 A2 | 9/1998 |
| EP | 0879935 B1 | 11/1998 |
| EP | 0933498 A1 | 8/1999 |
| EP | 1001133 A1 | 5/2000 |
| EP | 1132569 A2 | 9/2001 |
| EP | 1326003 A1 | 7/2003 |
| EP | 1362978 A1 | 11/2003 |
| EP | 1394355 A1 | 3/2004 |
| EP | 1396606 A2 | 3/2004 |
| EP | 1398640 A1 | 3/2004 |
| EP | 1403466 A2 | 3/2004 |
| EP | 1464789 A1 | 10/2004 |
| GB | 1292718 | 10/1972 |
| GB | 2382143 A | 4/2001 |
| WO | WO 93/15127 | 8/1993 |
| WO | WO 94/07949 | 4/1994 |
| WO | WO 94/08078 | 4/1994 |
| WO | WO 94/08090 | 4/1994 |
| WO | WO 95/09879 | 4/1995 |
| WO | WO 97/11845 | 4/1997 |
| WO | WO 99/27229 | 6/1999 |
| WO | WO 01/81914 | 11/2001 |
| WO | WO 01/87797 A1 | 11/2001 |
| WO | WO 02/12674 A1 | 2/2002 |
| WO | WO 03/027431 A1 | 4/2003 |
| WO | WO 04/037946 A1 | 5/2004 |
| WO | WO 04/038176 A1 | 5/2004 |
| WO | WO 05/021928 A2 | 3/2005 |

OTHER PUBLICATIONS

Halliburton, *CoalStim$^{SM}$ Service, Helps Boost Cash Flow From CBM Assets*, Stimulation, HO3679 Oct. 3, 2003, Halliburton Communications.

Halliburton, *Conductivity Endurance Technology For High Permeability Reservoirs, Helps Prevent Intrusion of Formation Material Into the Proppant Pack for Improved Long-term Production*, Stimulation, 2003, Halliburton Communications.

Halliburton, *Expedite® Service, A Step-Change Improvement Over Conventional Proppant Flowback Control Systems. Provides Up to Three Times the Conductivity of RCPs.*, Stimulation, HO3296 May 4, 2004, Halliburton Communications.

Halliburton Technical Flier—Multi Stage Frac Completion Methods, 2 pages.

Halliburton *"CobraFrac$^{SM}$ Service, Coiled Tubing Fracturing—Cost-Effective Method for Stimulating Untapped Reserves"*, 2 pages, 2004.

Halliburton *"CobraJetFrac$^{SM}$ Service, Cost-Effective Technology That Can Help Reduce Cost per BOE Produced, Shorten Cycle time and Reduce Capex"*, undated.

Halliburton Cobra Frac Advertisement, 2001.

Halliburton *"SurgiFrac$^{SM}$ Service, a Quick and cost-Effective Method to Help Boost Production From Openhole Horizontal Completions"*, 2002.

Halliburton, *SandWedge® NT Conductivity Enhancement System, Enhances Proppant Pack Conductivity and Helps Prevent Intrusion of Formation Material for Improved Long-Term Production*, Stimulation, HO2289 May 4, 2004, Halliburton Communications.

Almond et al., *Factors Affecting Proppant Flowback With Resin Coated Proppants*, SPE 30096, pp. 171-186, May 1995.

Nguyen et al., *A Novel Approach For Enhancing Proppant Consolidation: Laboratory Testing And Field Applications*, SPE Paper No. 77748, 2002.

SPE 15547, *Field Application of Lignosulfonate Gels To Reduce Channeling*, South Swan Hills Miscible Unit, Alberta, Canada, by O.R. Wagner et al., 1986.

Owens et al., *Waterflood Pressure Pulsing for Fractured Reservoirs* SPE 1123, 1966.

Feisenthal et al., *Pressure Pulsing—An Improved Method of Waterflooding Fractured Reservoirs* SPE 1788, 1957.

Raza, *"Water and Gas Cyclic Pulsing Method for Improved Oil Recovery"*, SPE 3005, 1971.

Peng et al., *"Pressure Pulsing Waterflooding in Dual Porosity Naturally Fractured Reservoirs"* SPE 17587, 1988.

Dusseault et al, *"Pressure Pulse Workovers in Heavy Oil"*, SPE 79033, 2002.

Yang et al., *"Experimental Study on Fracture Initiation By Pressure Pulse"*, SPE 63035, 2000.

Nguyen et al., *New Guidelines For Applying Curable Resin-Coated Proppants*, SPE Paper No. 39582, 1997.

Kazakov et al., *"Optimizing and Managing Coiled Tubing Frac Strings"* SPE 60747, 2000.

Advances in Polymer Science, vol. 157, *"Degradable Aliphatic Polyesters"* edited by A.-C. Alberston, 2001.

Gorman, *Plastic Electric: Lining up the Future of Conducting Polymers* Science News, vol. 163, May 17, 2003.

Gidley et al., *"Recent Advances in Hydraulic Fracturing,"* Chapter 6, pp. 109-130, 1989.

Simmons et al., *"Poly(phenyllactide): Synthesis, Characterization, and Hydrolytic Degradation, Biomacromolecules"*, vol. 2, No. 2, pp. 658-663, 2001.

Yin et al., *"Preparation and Characterization of Substituted Polylactides"*, Americal Chemical Society, vol. 32, No. 23, pp. 7711-7718, 1999.

Yin et al., *"Synthesis and Properties of Polymers Derived from Substituted Lactic Acids"*, American Chemical Society, Ch.12, pp. 147-159, 2001.

Cantu et al., *"Laboratory and Field Evaluation of a Combined Fluid-Loss Control Additive and Gel Breaker for Fracturing Fluids,"* SPE 18211, 1990.

Love et al., *"Selectively Placing Many Fractures in Openhole Horizontal Wells Improves Production"*, SPE 50422, 1998.

McDaniel et al. *"Evolving New Stimulation Process Proves Highly Effective In Level 1 Dual-Lateral Completion"* SPE 78697, 2002.

Albertsson et al., *"Aliphatic Polyesters: Synthesis, Properties and Applications"*, Advances in Polymer Science, vol. 57 Degradable Aliphatic Polyesters, 2002.

Dechy-Cabaret et al., *"Controlled Ring-Operated Polymerization of Lactide and Glycolide"* American Chemical Society, Chemical Reviews, A-Z, AA-AD, 2004.

Funkhouser et al., *"Synthetic Polymer Fracturing Fluid For High-Temperature Applications"*, SPE 80236, 2003.

*Chelating Agents*, Encyclopedia of Chemical Technology, vol. 5 (764-795), undated.

Vichaibun et al., *"A New Assay for the Enzymatic Degradation of Polylactic Acid, Short Report"*, ScienceAsia, vol. 29, pp. 297-300, 2003.

CDX Gas, CDX Solution, 2003, CDX, LLC, Available @ www.cdxgas.com/solution.html, printed pp. 1-2, undated.

CDX Gas, *"What is Coalbed Methane?"* CDX, LLC. Available @ www.cdxgas.com/what.html, printed p. 1, undated.

Halliburton brochure entitled "H2Zero™ Service Introducing The Next Generation of cost-Effective Conformance Control Solutions", 2002.

Halliburton brochure entitled ""INJECTROL® A Component, 1999.

Halliburton brochure entitled "INJECTROL® G Sealant", 1999.

Halliburton brochure entitled "INJECTROL® IT Sealant", 1999.

Halliburton brochure entitled "INJECTROL® Service Treatment", 1999.

Halliburton brochure entitled "INJECTROL® U Sealant", 1999.

Halliburton brochure entitled "Sanfix® A Resin", 1999.

Halliburton brochure entitled "Pillar Frac Stimulation Technique" Fracturing Services Technical Data Sheet, 2 pages, undated.

Foreign search report and opinion (CPW 21582 EP), Mar. 11, 2005.

METHODS AND COMPOSITIONS FOR STABILIZING UNCONSOLIDATED SUBTERRANEAN FORMATIONS

FIELD OF THE INVENTION

The present invention relates to improved methods for stabilizing unconsolidated regions in subterranean formations.

DESCRIPTION OF THE PRIOR ART

Hydrocarbon wells are often located in subterranean zones that contain unconsolidated particulate matter that can migrate out with the oil, gas, water, and/or other fluids produced by the wells. The presence of particulate matter, such as sand, in the produced fluids is disadvantageous and undesirable in that the particulates may abrade pumping and other producing equipment and reduce the fluid production capabilities of the producing zones. Unconsolidated subterranean zones include those which contain loose particulates that are readily entrained by produced fluids and those wherein the particulates making up the zone are bonded together with insufficient bond strength to withstand the forces produced by the production of fluids through the zones.

One method of controlling loose sands in unconsolidated formations involves placing a filtration bed of gravel near the wellbore in order to present a physical barrier to the transport of unconsolidated formation fines with the production of hydrocarbons. Typically, such so-called "gravel packing operations" involve the pumping and placement of a quantity of a desired particulate into the unconsolidated formation adjacent to the wellbore. Such packs are time consuming and expensive to install.

Another method used to control loose sands in unconsolidated formations involves consolidating unconsolidated subterranean producing zones into hard permeable masses by pre-flushing the formation, applying a hardenable resin composition, applying a spacer fluid, applying an external catalyst to cause the resin to set and applying an afterflush fluid to remove excess resin from the pore spaces of the zones. Such multiple-component applications, however, often result in uncertainty and create a risk for undesirable results. For example, when an insufficient amount of spacer fluid is used between the application of the hardenable resin and the application of the external catalyst, the resin may come into contact with the external catalyst in the wellbore itself rather than in the unconsolidated subterranean producing zone. This is very problematic. When resin is contacted with an external catalyst an exothermic reaction occurs that may result in rapid polymerization. The polymerization may damage the formation by plugging the pore channels, may halt pumping when the wellbore is plugged with solid material, or may even result in a down hole explosion as a result of the heat of polymerization. Also, using these conventional processes to treat long intervals of unconsolidated regions is not practical due to the difficulty in determining if the entire interval that has been treated with both the resin and the activation agent.

SUMMARY OF THE INVENTION

The present invention provides improved methods for consolidating unconsolidated subterranean producing zones.

One embodiment of the present invention describes a method of stabilizing a subterranean formation comprising the steps of applying to the subterranean formation a combination aqueous liquid and surfactant preflush solution, an integrated consolidation fluid and an afterflush fluid and then waiting a chosen period of time. The integrated consolidation fluid of the present invention may be a two-component epoxy-based consolidation fluid comprising a hardenable resin component and a hardening agent component, a one-component furan-based consolidation fluid, a one-component phenolic-based consolidation fluids, or a one-component high temperature epoxy-based consolidation fluid. The afterflush fluid of the present invention may be a liquid or a gas.

Another embodiment of the present invention describes a method of reducing the production of particulates from a subterranean formation comprising the steps of applying to the subterranean formation a combination aqueous liquid and surfactant preflush solution, an integrated consolidation fluid and an afterflush solution and then waiting a chosen period of time. The integrated consolidation fluid of the present invention may be a two-component epoxy-based consolidation fluid comprising a hardenable resin component and a hardening agent component, a one-component furan-based consolidation fluid, a one-component phenolic-based consolidation fluids, or a one-component high temperature epoxy-based consolidation fluid. The afterflush solution of the present invention may be a liquid or a gas.

Still another embodiment of the present invention describes an integrated consolidation fluid of the present invention capable of consolidating a subterranean formation without the need for an external catalyst. The integrated consolidation fluid comprises a hardenable resin component comprising a hardenable resin and a hardening agent component comprising a liquid hardening agent, a silane coupling agent, and a surfactant.

Other and further objects, features and advantages of the present invention will be readily apparent to those skilled in the art upon a reading of the description of preferred embodiments which follows.

DESCRIPTION OF PREFERRED EMBODIMENTS

The present invention provides improved methods for preventing the migration of loose and incompetent particulates in subterranean formations surrounding fractures and/or wellbores with fluids produced from the formations. The integrated consolidation fluids of the present invention exhibit high strengths and permeabilities after hardening, low viscosity, an ability to coat unconsolidated subterranean zones in the presence of formation fluids. Moreover, the integrated consolidation fluids of the present invention do not require the use of an external catalyst. While the compositions and methods of the present invention are useful in a variety of well completion and remedial operations, they are particularly useful in consolidating unconsolidated subterranean formations bordering wellbores and fractures.

The integrated consolidation fluids of the present invention comprise a hardenable resin component, and optionally a solvent component. The term "integrated consolidation fluid" refers to a consolidation fluid that may be applied in one step. That is, neither a spacer fluid nor an external catalyst is required for the fluid to effect consolidation of the treated subterranean formation. The integrated consolidation fluids of the present invention may be classified as one of four types: a two-component epoxy-based consolidation fluid comprising a hardenable resin component and a hardening agent component; a one-component furan-based consolidation fluid; a one-component phenolic-based consolidation fluid; or, a one-component high temperature ("HT") epoxy-based consolidation fluid.

Selection of the type of integrated consolidation fluid may be related to the temperature of the subterranean formation to which the fluid will be introduced. By way of example, for subterranean formations from about 60° F. to about 250° F., two-component epoxy-based consolidation fluids comprising a hardenable resin component and a hardening agent component containing specific hardening agents are preferred. For subterranean formations from about 300° F. to about 600° F., a one-component furan-based consolidation fluid is preferred. For subterranean formations from about 200° F. to about 400° F., either a one-component phenolic-based consolidation fluid or a one-component HT epoxy-based consolidation fluid is suitable.

Regardless of the type of integrated consolidation fluid chosen, its viscosity should preferably be controlled to ensure that it is able to sufficiently penetrate the unconsolidated portions of the subterranean formation. For example, where the subterranean formation being consolidated is a formation surrounding a wellbore, from about 1 to about 3 feet of penetration into the formation from the wellbore may be desired. Where the subterranean formation being consolidated is a formation wall adjacent to a propped fracture, for example, from about 0.25 to about 2 inches of penetration into the fracture wall is generally sufficient. To achieve the desired level of penetration, the consolidation fluid viscosity is preferably below 100 cP, more preferably below 40 cP, and most preferably below 10 cP. Achieving the desired viscosity will generally dictate a resin to solvent ratio ranging from about 1:0.2 to about 1:20. It is within the ability of one skilled in the art with the benefit of this disclosure to use a sufficient amount of a suitable solvent to achieve the desired viscosity and, thus, to achieve the preferred penetration into the subterranean formation.

One integrated consolidation fluid of the present invention is a two-component epoxy based consolidation fluid comprising a hardenable resin component and a hardening agent component. The hardenable resin component is comprised of a hardenable resin and an optional solvent. The solvent may be added to the resin to reduce its viscosity for ease of handling, mixing and transferring. It is within the ability of one skilled in the art with the benefit of this disclosure to determine if and how much solvent may be needed to achieve a viscosity suitable to the subterranean conditions. Factors that may affect this decision include geographic location of the well and the surrounding weather conditions. An alternate way to reduce the viscosity of the liquid hardenable resin is to heat it. This method avoids the use of a solvent altogether, which may be desirable in certain wells. The second component is the liquid hardening agent component, which is comprised of a hardening agent, a silane coupling agent, a surfactant for, inter alia, facilitating the coating of the resin on the proppant particles and causing the hardenable resin to flow to the contact points between adjacent resin coated proppant particles, an optional hydrolyzable ester for, inter alia, breaking gelled fracturing fluid films on the proppant particles, and an optional liquid carrier fluid for, inter alia, reducing the viscosity of the liquid hardening agent component. It is within the ability of one skilled in the art with the benefit of this disclosure to determine if and how much liquid carrier fluid is needed to achieve a viscosity suitable to the subterranean conditions.

Examples of hardenable resins that can be utilized in the liquid hardenable resin component include, but are not limited to, organic resins such as bisphenol A-epichlorohydrin resin, polyepoxide resin, novolak resin, polyester resin, phenol-aldehyde resin, urea-aldehyde resin, furan resin, urethane resin, glycidyl ethers and mixtures thereof. Of these, bisphenol A-epichlorohydrin resin is preferred. The organic resin utilized is included in the liquid hardenable resin component in an amount in the range of from about 70% to about 100% by weight of the liquid hardenable resin component, preferably in an amount of about 85%.

Any solvent that is compatible with the hardenable resin and achieves the desired viscosity effect is suitable for use in the present invention. Preferred solvents are those having high flash points (most preferably about 125° F.) because of, inter alia, environmental factors. As described above, use of a solvent in the hardenable resin composition is optional but may be desirable to reduce the viscosity of the hardenable resin component for ease of handling, mixing, and transferring. It is within the ability of one skilled in the art with the benefit of this disclosure to determine if and how much solvent is needed to achieve a suitable viscosity. Solvents suitable for use in the present invention include, but are not limited to, butylglycidyl ether, dipropylene glycol methyl ether, dipropylene glycol dimethyl ether, dimethyl formamide, diethyleneglycol methyl ether, ethyleneglycol butyl ether, diethyleneglycol butyl ether, propylene carbonate, methanol, butyl alcohol, d'limonene and fatty acid methyl esters. Of these, butylglucidyl ether is preferred. The amount of the solvent utilized in the liquid hardenable resin component is in the range of from about 0% to about 30% by weight of the liquid hardenable resin component, preferably in an amount of about 15%.

Examples of the hardening agents that can be utilized in the liquid hardening agent component of the two-component consolidation fluids of the present invention include, but are not limited to, amines, aromatic amines, polyamines, aliphatic amines, cyclo-aliphatic amines, amides, polyamides, 2-ethyl-4-methyl imidazole and 1,1,3-trichlorotrifluoroacetone. Selection of a preferred hardening agent is dependent, in part, on the temperature of the formation in which the hardening agent will be used. By way of example and not of limitation, in subterranean formations having a temperature from about 60° F. to about 250° F., amines and cyclo-aliphatic amines such as piperidine, triethylamine, N,N-dimethylaminopyridine, benzyldimethylamine, tris(dimethylaminomethyl)phenol, and 2-($N_2$N-dimethylaminomethyl)phenol are preferred with N,N-dimethylaminopyridine most preferred. In subterranean formations having higher temperatures, 4,4'-diaminodiphenyl sulfone may be a suitable hardening agent. The hardening agent is included in the liquid hardening agent component in an amount in the range of from about 40% to about 60% by weight of the liquid hardening agent component, preferably in an amount of about 50%.

The silane coupling agent may be used, inter alia, to act as a mediator to help bond the resin to the sand surface. Examples of silane coupling agents that can be utilized in the liquid hardening agent component of the two-component consolidation fluids of the present invention include, but are not limited to, N-2-(aminoethyl)-3-aminopropyltrimethoxysilane, 3-glycidoxypropyltrimethoxysilane, and n-beta-(aminoethyl)-gamma-aminopropyl trimethoxysilane. Of these, n-beta-(aminoethyl)-gamma-aminopropyl trimethoxysilane is preferred. The silane coupling agent is included in the liquid hardening agent component in an amount in the range of from about 0.1% to about 3% by weight of the liquid hardening agent component.

Any surfactant compatible with the liquid hardening agent and capable of facilitating the coating of the resin onto particles in the subterranean formation may be used in the present invention. Such surfactants include, but are not limited to, an ethoxylated nonyl phenol phosphate ester, mixtures of one or more cationic surfactants, and one or more non-ionic surfactants and an alkyl phosphonate surfactant. The mixtures of one or more cationic and nonionic surfactants are described in U.S. Pat. No. 6,311,773 issued to Todd et al. on Nov. 6, 2001, which is incorporated herein by reference. A $C_{12}$–$C_{22}$ alkyl phosphonate surfactant is preferred. The surfactant or surfactants utilized are included in the liquid hardening agent component in an amount in the range of from about 2% to about 15% by weight of the liquid hardening agent component, preferably in an amount of about 12%.

Use of a diluent or liquid carrier fluid in the hardenable resin composition is optional and may be used to reduce the viscosity of the hardenable resin component for ease of handling, mixing and transferring. It is within the ability of one skilled in the art, with the benefit of this disclosure, to determine if and how much liquid carrier fluid is needed to achieve a viscosity suitable to the subterranean conditions. Any suitable carrier fluid that is compatible with the hardenable resin and achieves the desired viscosity effects is suitable for use in the present invention. The liquid carrier fluids that can be utilized in the liquid hardening agent component of the two-component consolidation fluids of the present invention preferably include those having high flash points (most preferably above about 125° F.). Examples of liquid carrier fluids suitable for use in the present invention include, but are not limited to, dipropylene glycol methyl ether, dipropylene glycol dimethyl ether, dimethyl formamide, diethyleneglycol methyl ether, ethyleneglycol butyl ether, diethyleneglycol butyl ether, propylene carbonate, d'limonene and fatty acid methyl esters. Of these, dipropylene glycol methyl ether is preferred. The liquid carrier fluid is present in the liquid hardening agent component in an amount in the range of from about 0% to about 40% by weight of the liquid hardening agent component, preferably in an amount of about 30%.

Where the integrated consolidation fluid of the present invention is a one-component furan-based consolidation fluid, suitable furan-based resins include, but are not limited to, furfuryl alcohol, a mixture furfuryl alcohol with an aldehyde, and a mixture of furan resin and phenolic resin. Of these, furfuryl alcohol is preferred.

The furan-based resin may be combined with a solvent to control viscosity if desired. Suitable solvents for use in the furan-based consolidation fluids of the present invention include, but are not limited to 2-butoxy ethanol, butyl acetate, and furfuryl acetate. Of these, 2-butoxy ethanol is preferred.

Where the integrated consolidation fluid of the present invention is a one-component phenolic-based consolidation fluid, suitable phenolic-based resins include, but are not limited to, terpolymers of phenol, phenolic formaldehyde resins, and a mixture of phenolic and furan resins. Of these, a mixture of phenolic and furan resins is preferred.

The phenolic-based resin may be combined with a solvent to control viscosity if desired. Suitable solvents for use in the phenolic-based consolidation fluids of the present invention include, but are not limited to butyl acetate, butyl lactate, furfuryl acetate, and 2-butoxy ethanol. Of these, 2-butoxy ethanol is preferred.

Where the integrated consolidation fluid of the present invention is a one-component HT epoxy-based consolidation fluid, suitable HT epoxy-based components included, but are not limited to, bisphenol A-epichlorohydrin resin, polyepoxide resin, novolac resin, polyester resin, glycidyl ethers and mixtures thereof. Of these, bisphenol A-epichlorohydrin resin is preferred.

To achieve the beneficial effects of the present invention, it is preferred that a solvent be used with the one-component HT epoxy-based consolidation fluids of the present invention. Suitable solvents for use in the HT epoxy-based consolidation fluids of the present invention are those solvents capable of substantially dissolving the HT epoxy-resin chosen for use in the consolidation fluid. Such solvents include, but are not limited to, dimethyl sulfoxide and dimethyl formamide. Of these, dimethyl sulfoxide is preferred. A co-solvent such as dipropylene glycol methyl ether, dipropylene glycol dimethyl ether, dimethyl formamide, diethylene glycol methyl ether, ethylene glycol butyl ether, diethylene glycol butyl ether, propylene carbonate, d'limonene and fatty acid methyl esters, may also be used in combination with the solvent. Of these co-solvents, dipropylene glycol methyl ether is preferred.

One embodiment of the methods of the present invention for stabilizing a subterranean formation comprises the steps of applying preflush solution to the unconsolidated subterranean formation, applying adequate integrated consolidation fluid of the present invention to saturate the desired portion of the unconsolidated formation surrounding the wellbore, applying an afterflush fluid to the subterranean formation to, inter alia, remove excess consolidation fluid from the pore spaces and the wellbore, and then allowing time for the consolidation fluid to cure.

Another embodiment of the methods of the present invention for reducing the production of particulates from a subterranean formation comprises the steps of applying preflush solution to the unconsolidated subterranean formation, applying adequate integrated consolidation fluid of the present invention to saturate the desired portion of the unconsolidated formation surrounding the wellbore, applying an afterflush fluid to the subterranean formation to, inter alia, remove excess consolidation fluid from the pore spaces and the wellbore, and then allowing a chosen period of time for the consolidation fluid to cure.

The chosen period of time needed for the resin to cure will depend on the consolidation fluid used, the temperature of the formation, and the unconfined compressive strength needed in the particular application. Generally, the chosen period of time will be between about 0.5 hours and about 72 hours, preferably between about 6 hours and about 48 hours. Determining the proper cure time is within the ability of one skilled in the art with the benefit of this disclosure.

Preflush solutions suitable for use in the methods of the present invention comprise a combination of an aqueous liquid and a surfactant. The pre-flush solution, inter alia, readies the formation to receive the consolidation fluid and removes oils that may impede the consolidation fluid from making contact with the formation sands. The aqueous liquid may be salt water, brine or any other aqueous liquid that does not adversely react with the other components utilized in accordance with this invention. A preferred aqueous component of the preflush solution is brine. Any surfactant compatible with the aqueous liquid and capable of aiding the curable resin in coating the surface of unconsolidated particles of the subterranean formation may be suitable for use in the present invention. Suitable surfactants include, but are not limited to, ethoxylated nonyl phenol phosphate esters, one or more cationic surfactants, and one or more non-ionic surfactants and an alkyl phosphonate surfactant. The mixtures of one or more cationic and non-ionic surfactants are suitable and examples are described in U.S. Pat. No. 6,311,773 issued to Todd et al. on Nov. 6, 2001, the disclosure of which is incorporated herein by reference. A $C_{12}$–$C_{22}$ alkyl phosphonate surfactant is preferred.

The afterflush fluid may be achieved by using a fluid, such as an aqueous liquid or an inert gas. Where the afterflush fluid is an aqueous liquid, it may be salt water or brine or any other aqueous liquid that does not adversely react with the other components utilized in accordance with this invention. A preferred aqueous afterflush fluid solution is brine. Where an aqueous afterflush fluid is used, a volume of about 1 to about 5 times the volume of the consolidation fluid used is generally suitable. In some subterranean formations, particularly gas-producing subterranean formations, it may be advantageous to afterflush using an inert gas, such as nitrogen, rather than an aqueous solution to prevent interaction between the afterflush fluid and the formation. The afterflush fluid acts, inter alia, to displace the curable resin from the wellbore, to remove curable resin from the pore spaces inside the subterranean formation thereby restoring permeability and leaving behind some resin at the contact points between formation sand particulate to form a permeable, consolidated formation sand pack.

To facilitate a better understanding of the present invention, the following examples of some of the preferred embodiments are given. In no way should such examples be read to limit the scope of the invention.

EXAMPLES

A packed column was created by first packing 0.5 inches of 70/170-mesh sand at the bottom of a Teflon sleeve with inside diameter of 1.0 inch, packing about 4.25 inches of an actual formation sand on top of the 70/170-mesh sand, packing 0.25 inches of 20/40 mesh sand on top of the formation sand, and applying a 100-psi load to the packed column.

The initial permeability of the formation was determined using a solution 5% $NH_4Cl$ brine containing 1% by volume of an alkyl phosphonate surfactant. Next, the packed column was treated with 40 mL of a diluted consolidation fluid solution of low-temperature epoxy resin having a viscosity of 23 cP. The diluted consolidation fluid solution was created by combining 20 mL of a two-component epoxy-based consolidation fluid of the present invention and 20 mL of methanol solvent. The volume of 40 mL of consolidation fluid is equivalent to 2 pore volumes of the packed column. The packed column was then afterflushed with 40 mL of 5% $NH_4Cl$ and allowed to cure at 140° F. for 48 hours.

Once the packed column had cured for 48 hours, its permeability was again determined using a solution of 5% $NH_4Cl$ brine. Moreover, cores from the cured packed column were obtained and cut to size to determine the unconfined consolidate strength (UCS) of the consolidated cores.

The results of the tests are displayed in Table 1, below:

TABLE 1

| Well # | Initial Permeability (mD) | Final Permeability (mD) | % Regain | USC (psi) |
|---|---|---|---|---|
| 1 | 857 | 819 | 95 | 1700 |
| 2 | 305 | 206 | 67 | 1608 |

Such high regain values reflect that the permeability of the treated formation remained high after the resin treatment. High regain values generally translate into better production values.

What is claimed is:

1. A method of stabilizing a subterranean formation comprising the steps of:
    applying a preflush solution comprising an aqueous liquid and a surfactant to the subterranean formation;
    applying an integrated consolidation fluid to the subterranean formation wherein the integrated consolidation fluid comprises at least one of the following:
        (a) a two-component epoxy based consolidation fluid comprising
            (i) a hardenable resin component and
            (ii) a hardening agent component;
        (b) a one-component furan-based consolidation fluid;
        (c) a one-component phenolic-based consolidation fluid;
        (d) a one-component high temperature epoxy-based consolidation fluid;
    applying an afterflush fluid to the subterranean formation; and,
    waiting a chosen period of time.

2. The method of claim 1 wherein the subterranean formation is an area surrounding a wellbore.

3. The method of claim 2 wherein the consolidation fluid is applied such that the area surrounding the wellbore is saturated to a depth from about 1 to about 3 feet.

4. The method of claim 1 wherein the subterranean formation is an area surrounding a fracture.

5. The method of claim 4 wherein the consolidation fluid is applied such that the area surrounding the fracture is saturated to a depth is from about 0.25 to about 2 inches.

6. The method of claim 1 wherein the chosen period of time is from about 6 to about 48 hours.

7. The method of claim 1 wherein the consolidation fluid has a viscosity of below 100 cP.

8. The method of claim 1 wherein the consolidation fluid comprises a hardenable resin component comprising a hardenable resin and a hardening agent component comprising a liquid hardening agent, a silane coupling agent, and a surfactant.

9. The method of claim 8 wherein the hardenable resin in the hardenable resin component is an organic resin comprising at least one of the following: bisphenol A-epichlorohydrin resin, polyepoxide resin, novolak resin, polyester resin, phenol-aldehyde resin, urea-aldehyde resin, furan resin, urethane resin, glycidyl ethers, or mixtures thereof.

10. The method of claim 8 wherein the hardenable resin component further comprises a solvent for the hardenable resin.

11. The method of claim 10 wherein the solvent for the hardenable resin in the hardenable resin component comprises at least one of the following: butylglycidyl ether, dipropylene glycol methyl ether, dipropylene glycol dimethyl ether, dimethyl formamide, diethyleneglycol methyl ether, ethyleneglycol butyl ether, diethyleneglycol butyl ether, propylene carbonate, d'limonene, fatty acid methyl esters, or mixtures thereof.

12. The method of claim 8 wherein the liquid hardening agent in the hardening agent component comprises at least one of the following: amines, aromatic amines, aliphatic amines, cyclo-aliphatic amines, piperidine, triethylamine, benzyldimethylamine, N,N-dimethylaminopyridine, 2-($N_2$N-dimethylaminomethyl)phenol, tris(dimethylaminomethyl)phenol, or mixtures thereof.

13. The method of claim 8 wherein the silane coupling agent in the hardening agent component comprises at least one of the following: N-2-(aminoethyl)-3-aminopropyltrimethoxysilane, 3-glycidoxypropyltrimethoxysilane, n-beta-(aminoethyl)-gamma-aminopropyl trimethoxysilane or mixtures thereof.

14. The method of claim 8 wherein the liquid hardening agent further comprises a hydrolyzable ester.

15. The method of claim 14 wherein the hydrolyzable ester comprises at least one of the following: dimethylglutarate, dimethyladipate and dimethylsuccinate, sorbitol, catechol, dimethylthiolate, methyl salicylate, dimethyl salicylate, dimethylsuccinate, ter-butylhydroperoxide, or mixtures thereof.

16. The method of claim 8 wherein the surfactant in the hardening agent component comprises at least one of the following: ethoxylated nonyl phenol phosphate ester, mixtures of one or more cationic surfactants, a $C_{12}$–$C_{22}$ alkyl phosphonate surfactant, one or more non-ionic surfactants and an alkyl phosphonate surfactant, or mixtures thereof.

17. The method of claim 8 wherein the liquid hardening agent further comprises a liquid carrier fluid.

18. The method of claim 17 wherein the liquid carrier fluid comprises at least one of the following: dipropylene glycol methyl ether, dipropylene glycol dimethyl ether, dimethyl formamide, diethyleneglycol methyl ether, ethyleneglycol butyl ether, diethyleneglycol butyl ether, propylene carbonate, d'limonene, fatty acid methyl esters or mixtures thereof.

19. The method of claim 1 wherein the consolidation fluid comprises a furan-based resin.

20. The method of claim 19 wherein the furan-based resin comprises at least one of the following: furfuryl alcohol, a mixture furfuryl alcohol with an aldehyde, a mixture of furan resin and phenolic resin or mixtures thereof.

21. The method of claim 20 further comprising a solvent for the furan-based resin in the liquid hardenable resin component.

22. The method of claim 21 wherein the solvent comprises at least one of the following: 2-butoxy ethanol, butyl acetate, furfuryl acetate, or mixtures thereof.

23. The method of claim 1 wherein the consolidation fluid comprises a phenolic-based resin.

24. The method of claim 23 wherein the phenolic-based resin comprises at least one of the following: a terpolymer of phenol, phenolic formaldehyde resin, a mixture of phenolic and furan resin, or mixtures thereof.

25. The method of claim 24 further comprising a solvent for the phenolic-based resin.

26. The method of claim 25 wherein the solvent comprises at least one of the following: butyl acetate, butyl lactate, furfuryl acetate, 2-butoxy ethanol, or mixtures thereof.

27. The method of claim 1 wherein the consolidation fluid comprises a high temperature epoxy-based resin and a solvent.

28. The method of claim 27 wherein the high temperature epoxy-based resin comprises at least one of the following: bisphenol A-epichlorohydrin resin, polyepoxide resin, novolac resin, polyester resin, glycidyl ethers, or mixtures thereof.

29. The method of claim 27 wherein the solvent comprises at least one of the following: dimethyl sulfoxide, dimethyl formamide, dipropylene glycol methyl ether, dipropylene glycol dimethyl ether, dimethyl formamide, diethylene glycol methyl ether, ethylene glycol butyl ether, diethylene glycol butyl ether, propylene carbonate, d'limonene, fatty acid methyl esters, or mixtures thereof.

30. The method of claim 1 wherein the aqueous liquid in the preflush solution comprises at least one of the following: salt water, brine, or mixtures thereof.

31. The method of claim 1 wherein the surfactant in the preflush solution comprises at least one of the following: ethoxylated nonyl phenol phosphate ester, cationic surfactant, non-ionic surfactant, alkyl phosphonate surfactant, or mixtures thereof.

32. The method of claim 1 wherein the afterflush fluid is a liquid that comprises at least one of the following: salt water, brine, or mixtures thereof.

33. The method of claim 1 wherein the afterflush fluid is nitrogen gas.

34. A method of reducing the production of particulates from a subterranean formation comprising the steps of:
  applying a preflush solution comprising an aqueous liquid and a surfactant to the subterranean formation;
  applying an integrated consolidation fluid to the subterranean formation, wherein the integrated consolidation fluid comprises at least one of the following:
    (a) a two-component epoxy based consolidation fluid comprising
      (i) a hardenable resin component and
      (ii) a hardening agent component;
    (b) a one-component furan-based consolidation fluid;
    (c) a one-component phenolic-based consolidation fluid;
    (d) a one-component high temperature epoxy-based consolidation fluid;
  applying an afterflush fluid to the subterranean formation
  waiting a chosen period of time.

35. The method of claim 34 wherein the subterranean formation is an area surrounding a wellbore.

36. The method of claim 35 wherein the consolidation fluid is applied such that the area surrounding the wellbore is saturated to a depth from about 1 to about 3 feet.

37. The method of claim 34 wherein the subterranean formation is an area surrounding a fracture.

38. The method of claim 37 wherein the consolidation fluid is applied such that the area surrounding the fracture is saturated to a depth is from about 0.25 to about 2 inches.

39. The method of claim 34 wherein the chosen period of time is from about 6 to about 48 hours.

40. The method of claim 34 wherein the consolidation fluid has a viscosity of below 100 cP.

41. The method of claim 34 wherein the consolidation fluid comprises a hardenable resin component comprising a hardenable resin and a hardening agent component comprising a liquid hardening agent, a silane coupling agent, and a surfactant.

42. The method of claim 41 wherein the hardenable resin in the hardenable resin component is an organic resin comprising bisphenol A-epichlorohydrin resin, polyepoxide resin, novolak resin, polyester resin, phenol-aldehyde resin, urea-aldehyde resin, furan resin, urethane resin, glycidyl ethers, or mixtures thereof.

43. The method of claim 41 further comprising a solvent for the hardenable resin in the hardenable resin component.

44. The method of claim 43 wherein the solvent for the hardenable resin in the hardenable resin component comprises at least one of the following: butylglycidyl ether, dipropylene glycol methyl ether, dipropylene glycol dimethyl ether, dimethyl formamide, diethyleneglycol methyl ether, ethyleneglycol butyl ether, diethyleneglycol butyl ether, propylene carbonate, d'limonene, fatty acid methyl esters, or mixtures thereof.

45. The method of claim 41 wherein the liquid hardening agent in the hardening agent component comprises at least one of the following: amines, aromatic amines, aliphatic amines, cyclo-aliphatic amines, piperidine, triethylamine, benzyldimethylamine, N,N-dimethylaminopyridine, 2-($N_2$N-dimethylaminomethyl)phenol, tris(dimethylaminomethyl)phenol, or mixtures thereof.

46. The method of claim 41 wherein the silane coupling agent in the hardening agent component comprises at least one of the following: N-2-(aminoethyl)-3-aminopropyltrimethoxysilane, 3-glycidoxypropyltrimethoxysilane, n-beta-(aminoethyl)-gamma-aminopropyl trimethoxysilane or mixtures thereof.

47. The method of claim 41 wherein the liquid hardening agent further comprises a hydrolyzable ester.

48. The method of claim 47 wherein the hydrolyzable ester comprises at least one of the following: dimethylglutarate, dimethyladipate and dimethylsuccinate, sorbitol, catechol, dimethylthiolate, methyl salicylate, dimethyl salicylate, dimethylsuccinate, ter-butylhydroperoxide, or mixtures thereof.

49. The method of claim 41 wherein the surfactant in the hardening agent component comprises at least one of the following: ethoxylated nonyl phenol phosphate ester, mixtures of one or more cationic surfactants, a $C_{12}$–$C_{22}$ alkyl phosphonate surfactant, one or more non-ionic surfactants and an alkyl phosphonate surfactant, or mixtures thereof.

50. The method of claim 41 wherein the liquid hardening agent further comprises a liquid carrier fluid.

51. The method of claim 50 wherein the liquid carrier fluid comprises at least one of the following: dipropylene glycol methyl ether, dipropylene glycol dimethyl ether, dimethyl formamide, diethyleneglycol methyl ether, ethyleneglycol butyl ether, diethyleneglycol butyl ether, propylene carbonate, d'limonene, fatty acid methyl esters or mixtures thereof.

52. The method of claim 34 wherein the consolidation fluid comprises a furan-based resin.

53. The method of claim 52 wherein the furan-based resin comprises at least one of the following: furfuryl alcohol, a mixture furfuryl alcohol with an aldehyde, a mixture of furan resin and phenolic resin or mixtures thereof.

54. The method of claim 53 wherein the liquid hardenable resin component further comprises a solvent for the furan-based resin.

55. The method of claim 54 wherein the solvent comprises at least one of the following: 2-butoxy ethanol, butyl acetate, furfuryl acetate, or mixtures thereof.

56. The method of claim 34 wherein the consolidation fluid comprises a phenolic-based resin.

57. The method of claim 56 wherein the phenolic-based resin comprises at least one of the following: terpolymer of phenol, phenolic formaldehyde resin, a mixture of phenolic and furan resin, or mixtures thereof.

58. The method of claim 57 further comprising a solvent for the phenolic-based resin.

59. The method of claim 58 wherein the solvent comprises at least one of the following: butyl acetate, butyl lactate, furfuryl acetate, 2-butoxy ethanol, or mixtures thereof.

60. The method of claim 34 wherein the consolidation fluid comprises a high temperature epoxy-based resin and a solvent.

61. The method of claim 60 wherein the high temperature epoxy-based resin comprises at least one of the following: bisphenol A-epichlorohydrin resin, polyepoxide resin, novolac resin, polyester resin, glycidyl ethers, or mixtures thereof.

62. The method of claim 60 wherein the solvent comprises at least one of the following: dimethyl sulfoxide, dimethyl formamide, dipropylene glycol methyl ether, dipropylene glycol dimethyl ether, dimethyl formamide, diethylene glycol methyl ether, ethylene glycol butyl ether, diethylene glycol butyl ether, propylene carbonate, d'limonene, fatty acid methyl esters, or mixtures thereof.

63. The method of claim 34 wherein the aqueous liquid in the preflush solution comprises at least one of the following: salt water, brine, or mixtures thereof.

64. The method of claim 34 wherein the surfactant in the preflush solution comprises at least one of the following: ethoxylated nonyl phenol phosphate ester, cationic surfactant, non-ionic surfactant, alkyl phosphonate surfactant, or mixtures thereof.

65. The method of claim 34 wherein the afterflush fluid is a liquid that comprises at least one of the following: salt water, brine, or mixtures thereof.

66. The method of claim 34 wherein the afterflush fluid is nitrogen gas.

* * * * *